United States Patent [19]

Beyl

[11] Patent Number: 4,807,368
[45] Date of Patent: Feb. 28, 1989

[54] JIG FOR FACILITATING THE ADJUSTMENT OF A BLOCK UNDER THE SOLE OF A CYCLIST'S SHOE, A SOLE AND A CYCLIST'S SHOE ADAPTED TO SUCH A JIG

[76] Inventor: Jean Beyl, 10, boulevard Victor Hugo, 58000 Nevers, France

[21] Appl. No.: 130,543

[22] Filed: Dec. 9, 1987

[30] Foreign Application Priority Data

Dec. 16, 1986 [FR] France ................... 8617548

[51] Int. Cl.⁴ .............................................. A43D 1/00
[52] U.S. Cl. .......................................... 33/3 B; 36/131
[58] Field of Search ............... 33/3 R, 3 A, 3 B, 3 O; 36/131

[56] References Cited

U.S. PATENT DOCUMENTS 1,670,664  5/1928  Jones .
2,312,410  3/1943  Hewitt, Jr. .

FOREIGN PATENT DOCUMENTS 0063542  3/1982  European Pat. Off. .
2412278  7/1979  France .

Primary Examiner—Harry N. Haroian
Attorney, Agent, or Firm—Cushman, Darby & Cushman

[57] ABSTRACT

The jig for facilitating the adjustment of a block under the sole of a cyclist's shoe, comprises a support (5) whereon the user's foot (6) is intended to be positioned. This support (5) is provided with an indentation (7) intended to receive the bulge corresponding to the articulation of the first metatarsal; a stop (19) is slidably mounted along the longitudinal direction of the support (5), this stop (19) being capable of being applied against one end of the foot (6), and provision is made for at least one graduation (G) on a longitudinal edge of the support, so as to cooperate with a specific zone (33) of the stop (19), to indicate the correct adjustment of the block (2) to be carried out, so that the articulation of the first metatarsal should occupy a specific position in relation to the axis (34a) of the pedal (34).

13 Claims, 4 Drawing Sheets

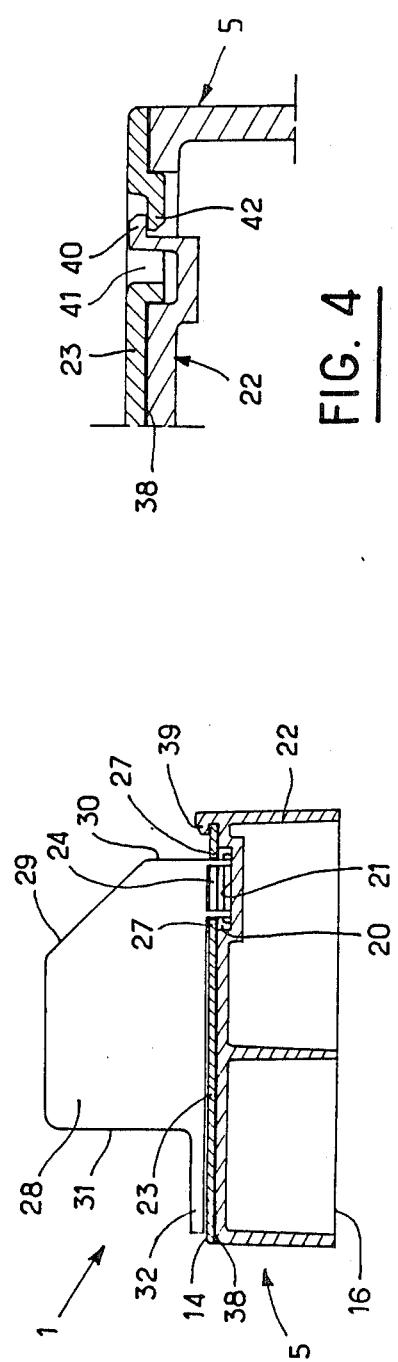
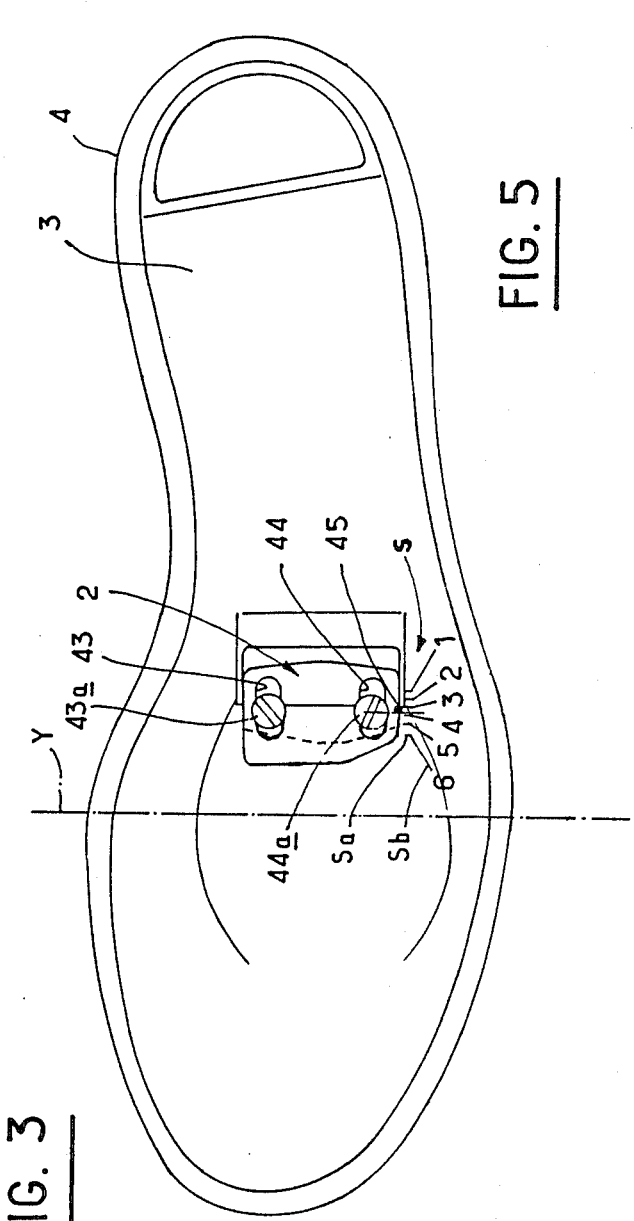

JIG FOR FACILITATING THE ADJUSTMENT OF A BLOCK UNDER THE SOLE OF A CYCLIST'S SHOE, A SOLE AND A CYCLIST'S SHOE ADAPTED TO SUCH A JIG

The invention relates to a jig for facilitating the adjustment of a block under the sole of a cyclist's shoe, comprising a support whereon the user's foot is intended to be positioned.

It is known that cyclists, in particular racing cyclists and touring cyclists, who cover relatively large distances frequently use blocks fixed under their cyclist's shoes to ensure an accurate and constant positioning of the shoe and foot on the bicycle pedal, so as to obtain an optimum efficiency of the forces exerted.

The adjustment of this block is relatively tricky and depends inter alia on the shape of the user's feet. Hitherto such an adjustment has been effected in a more or less empirical manner. The object of the invention is above all to provide a jig which would allow such an adjustment to be effected under better conditions. It is, in particular, desirable that this adjustment should be accurate, whilst remaining simple and fast to execute.

According to the invention, a jig for facilitating the adjustment of a block under the sole of a cyclist's shoe, comprising a support whereon the user's foot is intended to be positioned, is characterised in that this support is provided with an indentation intended to receive the bulge corresponding to the articulation of the first metatarsal of the foot; that a stop is slidably mounted along the longitudinal direction of the support, this stop being capable of being applied against one end of the foot and that provision is made for at least one graduation along the longitudinal direction of the support, so as to cooperate with a specific zone of the stop to indicate the correct block adjustment to be effected, so that the articulation of the first metatarsal should occupy a specific position in relation to the pedal axis.

This jig thus makes it possible to obtain quickly a relatively accurate dimension allowing the articulation of the first metatarsal (big toe) to be correctly positioned in relation to the pedal axis.

Preferably, the sliding stop is provided at the rear of the support so as to be applied against the rear of the heel of the user's foot. This stop is provided with an index or equivalent means cooperating with the graduation of the support.

Advantageously, the upper surface of the support has a longitudinal profile in the shape of an open V, the indentation of the support being constituted by the point of the V.

The graduation provided on one longitudinal edge of the support is formed by several series of marks and numbers, these marks and numbers being longitudinally staggered within one and the same series, the series being longitudinally and transversely staggered, each series being associated with one shoe size, the reading off of the appropriate graduation for the adjustment of the block being effected on the series corresponding to the size of the user's shoe.

The graduation is established in such a way that the values read off on this graduation correspond to one adjustment of the block in relation to a reference line under the sole for the shoe size considered.

Advantageously, the reference line is situated at a distance from the heel of the sole which is equal to the statistical mean of the distance of the articulation of the first metarasal from the heel of the foot with regard to the users' feet having the shoe size considered.

Preferably, the series of marks and numbers of the jig are established by taking into account the structure of the pedal and of the block intended to be fixed under the shoe in such a way that by effecting the adjustment of the block with the indications provided by the jig, the articulation of the first metatarsal is located opposite the geometrical axis of the pedal.

The sliding stop of the jig can comprise a transverse extension intended to cover up the graduation, this extension comprising at least one window constituting the index through which one can read off the value of the graduation which is appropriate for the adjustment.

The series of marks and numbers situated substantially at the same longitudinal level and associated with various shoe sizes have a different presentation facilitating identification of the series associated with the size. Advantageously, this different presentation is formed by a different colour background associated with each shoe size.

The jig can comprise, towards its other longitudinal edge, a sequence of zones which can partly overlap, corresponding to the various possible shoe sizes, each one of these zones having a presentation, in particular a colour, which is similar to the series wherewith it should be associated.

Advantageously, the jig comprises a frame whereon a sheet is applied carrying the graduation whilst a plate of a transparent material is applied against this sheet so as to assume the shape of the frame whereon it is held by fixing means, the user's foot being intended to be placed on this transparent plate through which the graduation can be read off.

The invention also relates to a sole of a cyclist's shoe intended to be provided with a block, this sole being arranged so as to make it possible to adjust the block in conjunction with the jig. Such a sole is characterised in that it comprises at least one mark, marked on the sole, related to the above mentioned reference line whose distance from the heel of the sole depends on the size of the shoe for which this sole is intended.

Preferably, this sole comprises a series of marks and numbers corresponding to those of the jig, the adjustment of the block being obtained by placing an index provided on this block opposite the mark corresponding to the number engraved under the sole which is identical to that read off on the jig.

According to an advantageous solution, the sole for the cyclist's shoe intended to be provided with a block comprises an internal cut out wherein a small plate is slidably mounted along the longitudinal direction of the sole, and oblong holes passing through this sole and issuing in this cut out, the block being fixed to the plate by screws passing through the oblong holes, the said block being capable of sliding with the plate in relation to the sole when the screws are loosened to allow a longitudinal adjustment.

The sole can be provided with a block and a stop situated in front of the block; the sole then comprises other oblong holes situated in front of those associated with the block, and the stop is fixed to the said plate by screws passing through these other oblong holes, the assembly of the block, the stop and the plate then being capable of sliding as one block when the screws are loosened.

The invention also relates to a cyclist's shoe provided with a sole such as defined above.

Apart from the arrangements set out above, the invention conists of a certain number of other arrangements which will be discussed in greater detail below with reference to a particular mode of embodiment described with reference to a attached drawings, but which is in no way restrictive.

FIG. 1 of these drawings is a view in plan of a jig in accordance with the invention.

FIG. 3 is a cross section along line III—III of FIG. 1.

FIG. 4 is a partial cross section along line IV—IV of FIG. 1 on an enlarged scale.

FIG. 5 is a view fom the bottom of a shoe provided with a sole arranged for a fast adjustment of the block in conjunction with the jig.

Figure 7:
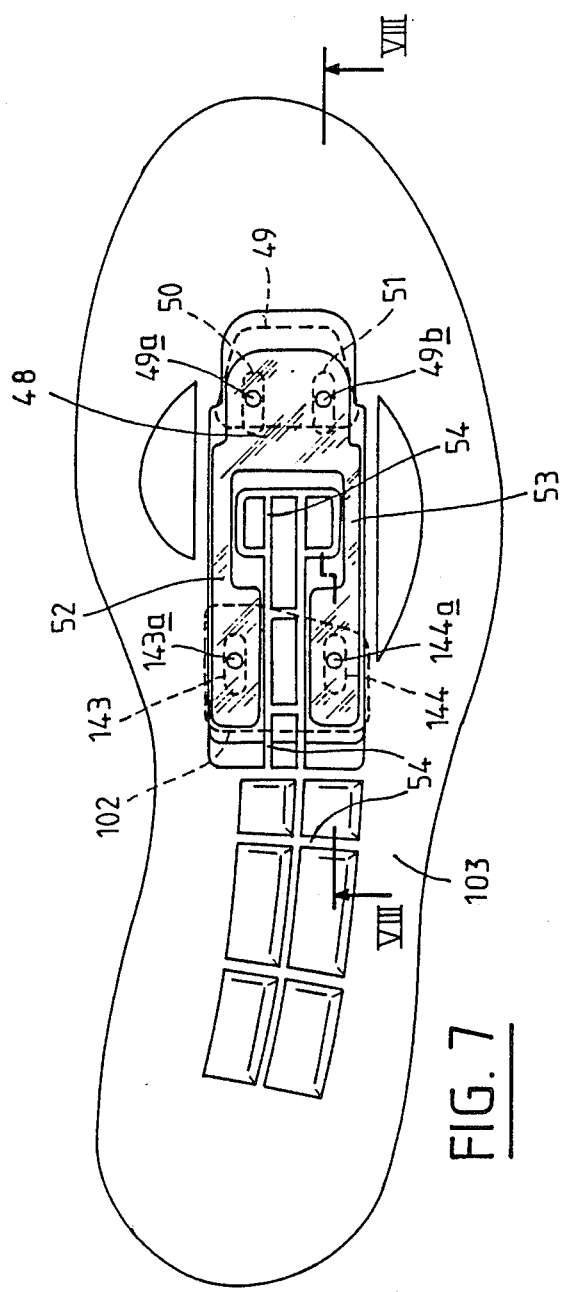
FIG. 7 is a top view of an advantageous embodiment of a sole of a cyclist's shoe with an adjustable block.
Figure 8:
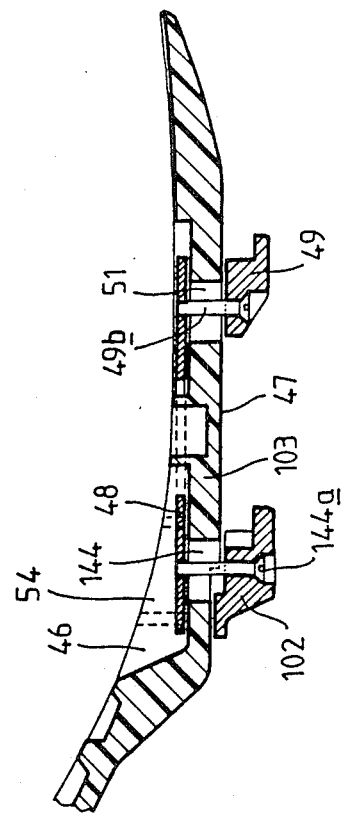

Finally FIG. 8 is a partial cross section along line VIII—VIII of FIG. 7.

Referring to the drawings, a jig 1 may be seen for facilitating the adjustment of a block 2 (FIG. 5) under the sole 3 of a cyclist's shoe 4.

Figure 1:
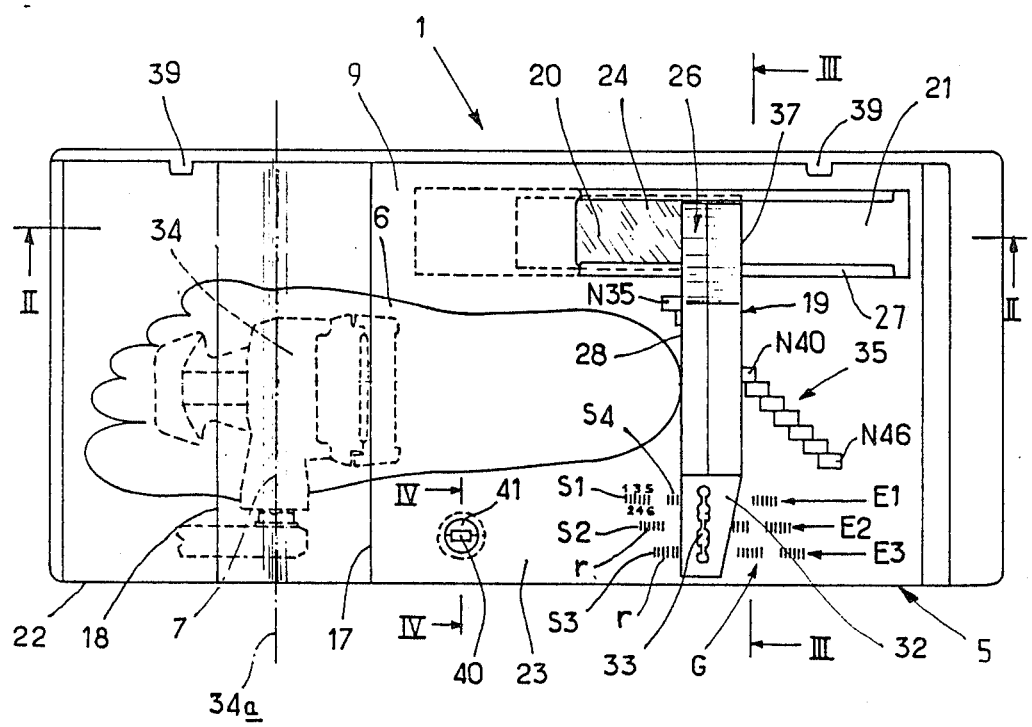

The jig 1 comprises a support 5 whereon the user's foot 6 is intended to be positioned. Viewed in plan, this support 5 has a rectangular shape (FIG. 1). The support 5 is provided with an indentation 7, (FIG. 2) intended to receive the bulge corresponding to the articulation of the first metatarsal (big toe) of a foot 6.

Figure 2:
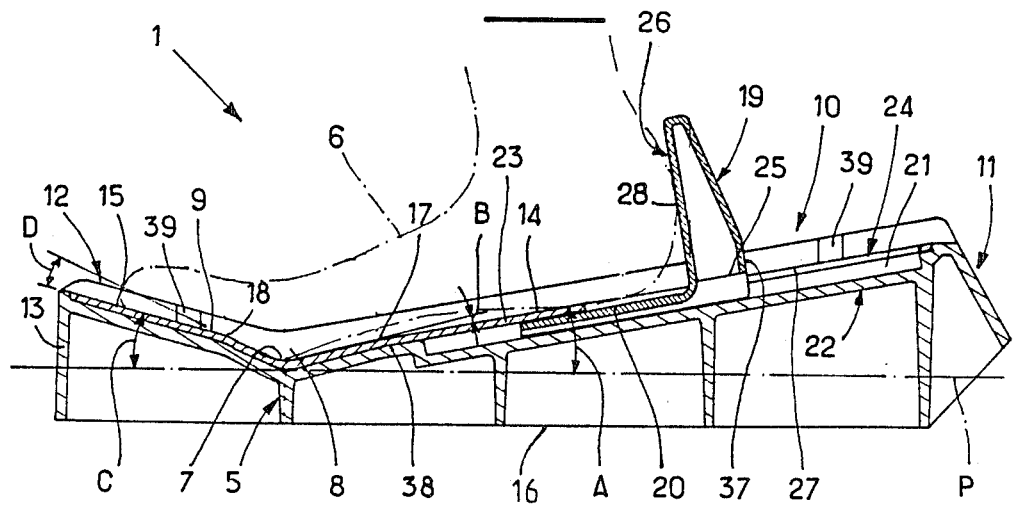
FIG. 2 is a vertical cross sectional view of the jig of FIG. 1.

The upper surface 9 of the support 5 has the longitudinal profile of an open V whose concavity is turned upwards, as may be seen in FIG. 2. The indentation 7 is constituted by the point of the V which extends transversely over the whole width of the jig.

The rear portion 10 which extends from the indentation 7 as far as the rear end 11 of the jig, has a length L which is distinctly greater than the length l of the front portion 12 of this jig. This portion 12 extends from the indentation 7 as far as the front end 13.

The upper surface of the jig 1 therefore has a double inclination in the longitudinal direction; the upper surface 14 of the rear portion 10 slopes from the rear end towards the indentation 7, whilst the upper surface 15 of the front portion 12 slopes in the opposite direction from the front end towards the indentation 7.

The major portion of the surface 14 is constituted by a flat surface inclined, in relation to a plane P parallel to the plane of the base 16 of the jig, by an angle A which is advantageously of the order of 10°. This slope increases by an angle B, advantageously of the order of 5° near the indentation 7. The break in the slope 17 corresponding to this increase in the angle of inclination is situated at a distance e from the indentation 7. This distance e can be of the order of 4 cm.

The upper surface 15 of the front portion is also constituted over its greater part by a flat surface having an angle of inclination C in relation to the plane P. Preferably, this angle C is greater than A; C can be of the order of 15°. A break in the slope 18 corresponding to an increase by an angle D of the slope is produced at a distance h, ahead of the indentation. The angle D is preferably greater than B and is, in particular, of the order of 10°.

This arrangement of the upper surface 14, 15 of the jig allows the bulge of the big toe, corresponding to the articulation of the first metatarsal, to be correctly and easily positioned.

A stop 19 is slidably mounted along the longitudinal direction on the rear portion 10 of the jig. The stop 19 comprises a plate 20, provided with stiffening ribs, intended to be engaged in a longitudinal groove 21 provided on the upper surface of a frame 22 fitted with vertical cross pieces constituting a portion of the support 5. This frame 22 is advantageously made of a plastic material. The groove 21 is open towards the top; the hold of the plate 20 in this groove 21, when sliding, is ensured by means of a plate 23, advantageously made of a transparent plastic material, which assumes the shape of the upper surface of the frame and which is fixed to this latter. This plate 23 comprises a longitudinal hole 24 allowing a part 25 to pass which ensures the connection between the plate 20 and a transverse portion 26 of the stop 19. The longitudinal edges 27 of the plate 23, delimiting the opening 24 project transversely towards the inside in relation to the groove 21, so as to cover the plate 20 partly and to ensure the hole of this plate in this groove, whilst allowing longitudinal sliding.

The transverse portion 26 is substantially orthogonal to the plate 20 and to the upper surface 14 of the jig.

This portion 26 which constitutes a kind of cursor, extends transversely towards the longitudinal edge on the opposite side to that provided with the groove 21. The front face 28 of this portion 26 is flat and orthogonal to the longitudinal direction of the upper surface 14. The upper edge of the transverse portion 26 is situated at a distance k from the upper surface 14, which is sufficient to allow the face 28 to be placed tangentially against the rear of the heel of the foot 6.

As may be seen in FIG. 3, the effective portion of the face 28 which is capable of being applied against the heel of the foot 6 corresponds to a zone comprised between the groove 21 and the longitudinal edge of the support 5 on the opposite side. The upper edge of this zone of the face 28 is parallel to the surface 14. The external contour of this face 28 is extended on the side of the groove 21 by an inclined portion 29 joined to an edge 30 orthogonal to the surface 14. On the other side, the face 28 is delimited by a set back 31 orthogonal to the surface 14 which ensures the transition of the face 28 to a transverse extension 32 which extends substantially as far as the longitudinal edge of the support 5. This extension 32 comprises a transverse window 33 constituting an index through which one can read a graduation G provided on the longitudinal edge 5 of the support on the opposite side to the groove 21.

Figure 6:
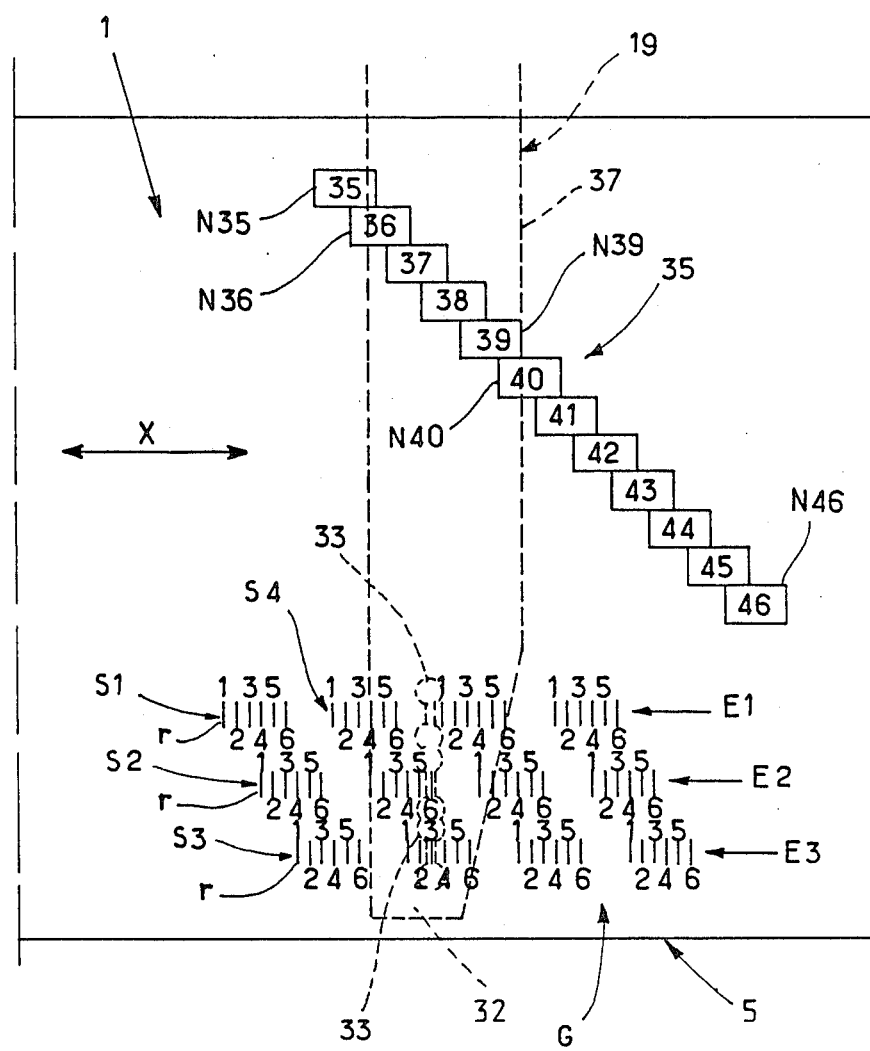
FIG. 6 is a view on an enlarged scale of a detail of FIG. 1.

The graduation G is formed by several series S1, S2, S3 . . . of marks r and numbers (see FIG. 6). The marks r are formed by transverse lines orthogonal to the longitudinal direction X of the support 5. The longitudinal distance (or pitch) between two consecutive marks r within one and the same series is constant and advantageously equal to 2 mm. In the example of the embodiment illustrated in FIG. 1, each series comprises six marks r formed by parallel lines, each mark being numbered by numerals 1 to 6; the odd numbers 1, 3 and 5 are situated on one side of the set of the marks r of the series, for example above these marks according to the representation of FIG. 6, whilst the even numbers 2, 4, 6 are situated below this series which facilitates the reading.

The series S1, S2 . . . are staggered longitudinally and transversely. In the example of FIG. 1, three series sets E1, E2, E3 are disposed along three parallel median lines.

Each series S1, S2 is associated with one shoe size. In the particular example of the embodiment represented in FIG. 1, the series S1 situated right in front of the set E1 situated nearest the groove 21 corresponds to the size 35, taken to be the smallest.

The series S2 which corresponds to the next higher size is constituted by that situated right in front of the set E2 placed below the set E1. The longitudinal displacement between the series S1 and the series S2 corresponds substantially to half the length of one series, so that there exists a range of overlapping between these two series along the longitudinal direction.

The series S3 corresponding to the next higher size will be constituted by that situated right in front of the set E3.

The series S4 corresponding to the next higher size will be constituted by the second series of the set E1, that is to say, that situated just after the series S1 and so on.

The graduation G is established in such a way that the values read off on this graduation correspond to one adjustment of the block 2, (FIG. 5) in relation to a reference line Y under the sole 3 for the size in question. Advantageously, this reference line Y which is imaginary and generally is not expressed by a mark under the sole 3 of the shoe, is situated at a distance H (FIG. 5) from the heel of the sole 3 or of the shoe, which is equal to the statistical mean of the distance J (FIG. 2) of the articulation of the first metatarsal from the heel, as regards the feet of the various users having the size considered.

The series S1, S2 ... of the marks and numbers are established, taking the structure of the pedal 34, represented in an imaginary manner in FIG. 1, into account and of the block 2 in such a way that by effecting the adjustment of this block with the indications provided by the jig 1, the articulation of the first metatarsal of the user's foot comes to be opposite the geometrical axis 34a of the panel.

Preferably, the jig 1 comprises on the side of its longitudinal edge remote from the graduation G, a sequence 35 of zones N35, N36 ... N46 represented by rectangles whose large dimension is parallel to the longitudinal directio of the jig. These rectangles follow in steps, as may be seen in FIGS. 1 and 6, being staggered along the longitudinal direction and along the transverse direction. In practice, two successive rectangles are staggered along the longitudinal direction by half their width, so that they touch each other substantially over half of the length of one of their sides. The length of each rectangle corresponds to one shoe shize. Within each rectangle, there appears a number 35, 36 ... 46 indicating one shoe size.

Each zone N35, N36 ... has a presentation which is different from that of the zone surrounding it. Preferably, this presentation consists of a different colour background for each zone; for example, the zone N35 will be red, N36 will be green, N37 yellow. N38 will again be red and so on.

The series of marks and numbers situated substantially at the same longitudinal level such as S1, S2 and S3 and associated with different sizes have a different presentation to facilitate identification of the series (through the window 33) associated with the shoe size in question. This different presentation is advantageously formed by a different colour background corresponding to that of the zones N35, N36 ... wherewith the series is to be associated.

Thus, the series S1 will be presented on a red background corresponding to N35; the series S2 on a green background corresponding to N36 and the series S3 on a yellow background corresponding to N37. It is clear that these colour examples are simply intended to facilitate the explanations and are not restrictive; it suffices to take different colours or shades allowing fast identification.

The series S4 consituting the second series of the set S1 will also be presented on a red background corresponding to N38 and the sequence of a green background, a yellow background and so, on will again be met in the following series.

The associated size is read off at the level of the rear transverse edge of the cursor 19 on the zone of the sequence 35 traversed by this edge 37. Because of the partial overlapping of the zone, there do exist positions of the cursor 19 wherein two sizes are possible. It is up to the user to determine the size he has chosen according to his usage; the reading of the graduation G will be effected on the series corresponding to this size.

Advantageously, the graduations G and the sequence 35 of the zones N35, N36 ... are printed on a sheet 38, made in particular of a plastic material, which is held between the upper surface of the frame 22 and the transparent plate 23 through which the graduations and the zones can be read.

The plate 23 can be secured on the frame 22 by means of two catches 39 provided on one longitudinal edge of the frame and below which there is engaged one longitudinal edge of the plate 23. The fixing is completed by making provision on the frame, midway on the frame on the opposite side, for a catch engagement tongue 40 (FIG. 4) capable of engaging in an opening 41 of the plate 23 and securing one edge 42 of this opening.

The sole 3 of the cyclist's shoe is advantageously adapted to the jig 1 to allow the block 2 to be quickly adjusted.

For this purpose, as may be seen in FIG. 5, the sole 3 carries on its lower surface, a series of marks and numbers s corresponding to those of the series S1, S2 ... of the jig. Each mark s is formed by a broken line comprising a transverse portion Sa, drawn so as to be parallel to the axis of the pedal when the shoe is correctly fixed on the pedal. This portion Sa is extended by a portion sloping towards the front or towards the rear, Sb. All the portions Sa are parallel to each other and equidistant. The distance between two successive portions Sa is the same as the distance between two successive marks r (FIG. 1) of one and the same series, that is to say, 2 mm in the example considered. The portions Sb spread out from each other in a fan shape to allow a good separation between the numbers printed or engraved at each end of one portions Sb, in particular to facilitate their being read. The numerals 1 to 6 of each series of the jig will be met again. However, on the sole, the FIG. 1 corresponds to the mark being located right at the back, whilst on the jig, the FIG. 1 corresponds to the mark located right at the front and vice versa for the numeral 6.

The implantation of the marks s on the sole of the shoe is effected in accordance with the reference line Y. The distance g between the median line of the marks s and the tangent at the rear of the sole 3 is equal to $H-d$. The value of d is chosen according to the structure of the pedal and of the block 2.

The adjustable block 2 comprises two oblong holes 43, 44 whose large dimension is orientated perpendicular to the portions Sa. The fixing of the block 2 is ensured by means of the screws 43a, 44a screwed into tapped inserts (not represented) provided in the sole 3 of the shoe. It is possible to cause the block 2 to slide on either side of a median position by loosening the screws; The locking of the block is ensured by the tightening of these screws.

The marks s are scheduled so as to be situated along one longitudinal edge of the block 2. This latter carries on this longitudinal edge an index 45, for example constituted by an engraved line, opposite which the appopriate mark s is read off.

The set of graduations provided on the jig 1 and of the marks s provided on the sole 3 and the implantation of the index 45 are effected in such a way that by displaying the number read off on the jig for the size considered, opposite the index 45 of the block 2, the correct adjustment is obtained.

FIGS. 7 and 8 represent an advantageous variant of the embodiment of the sole of a cyclist's shoe, arranged to allow a quick and accurate adjustment of the block provided under the sole. The elements of FIGS. 7 and 8 which are identical or perform similar functions to the elements already described, with reference to the preceding Figures, are designated by reference numerals equal to the sum of the number 100 and of the reference numeral used for the preceding Figures. The description of these elements will not be repeated or will only be briefly repeated.

The adjustment of the block 102 along the longitudinal direction of the sole is made possible thanks to oblong holes 143, 144 provided in the sole 103. These holes 143, 144 completely pass through the sole and issue on the inside in a cut out 46 intended to be covered by a lining (not shown) whereon the user's foot will rest. The bottom of this cut out 46 is flat and parallel to the lower surface 47 of the sole.

A small plate 48, preferably a metallic one, is slidably mounted against the bottom of the cut out 46 on the internal side of the sole. This plate 48 comprises tapped holes intended to receive the end of the fixing screws 143a, 144a of the block 102, these screws passing through the holes provided in the sole 103.

The block 102 which determines the position of the shoe on the pedal can be associated with a stop 49 situated more towards the front, under the sole 103 and only intended to facilitate the engagement of the block 102 in a fixing system of the pedal. When the shoe is fixed on the pedal by means of the block 102, this block 49 does not bear at the front against a zone of the pedal. The longitudinal distance between the block 102 and the stop 49 is constant for a given type of pedal. Advantageously, the stop 49 is also fixed to the plate 48 which is extended towards the front, by means of screws 49a, 49b passing through oblong holes 50, 51 provided in the sole 103, ahead of the holes 143, 144. Provision is made for tapped holes at the front end of the plate 48 m to receive the ends of the screws 49a, 49b.

It thus becomes immediately evident that when the fixing screws of the block 102 and of the stop 49 are not tightened, these two members can slide as one block along the longitudinal direction of the sole together with the plate 48.

Tightening the screws 143a, 144a and 49a, 49b, allows the plate 48, the block 102 and the stop 49 to be locked.

As may be seen according to FIG. 7, this plate 48 is guided by the walls of the cut out 46 and comprises a substantially rectangular front portion wherein provision is made for the tapped holes for the screws 49a and 49b; this portion is extended, at each lateral end, by arms 52, 53 whose external edges are parallel to each other and parallel to the medial longitudinal direction of the sole. These arms 52 and 53 have a greater width towards the rear, their internal side approaching the median longitudinal direction of the sole. The tapped holes intended to receive the ends of the screws 143a 143b are provided in these enlarged rear ends of the arms 52 and 53.

Provision is made for ribs 54 stiffening the sole in the free space comprised between the internal edges of the arms 52, 53. These ribs 54 can, with their lateral wall, also contribute to guiding the sliding of the plate 48.

It should be observed that such an adjustment device merely allows a longitudinal adjustment of the block 102. This is not inconvenient, becaus a shoe whose sole is provided with such a block adjustment device is intended to be used with a fixing device provided on the pedal which allows a certain angular freedom of movement for the shoe and the user's foot, so that no angular adjustment of the block is necessary. Such a fixing device is described, for example, in the patents Nos. FR 2 564 414 and FR 2 574 743.

The sole 103 is advantageously made of a moulded plastic material and comprises, like the sole 3 of FIG. 5, graduations (not visible in FIGS. 7 and 8), which are similar to the graduations S, of FIG. 5, whilst the block 102 comprises an index, (not visible in FIGS. 7 and 8), similar to the index 45 of FIG. 5.

The use of the jig and the adjustment of the block 2 or 102 are effected as follows:

The foot 6 of the cyclist to be equipped is positioned on the jig 1, so that the bulge of the big toe (articulation of the first metatarsal) comes to be in the indentation 7 of the V.

The sliding stop 19 is then pushed to bear against the heel of the foot 6, as schematically outlined in FIG. 1. The front face of this stop comes to bear against the heel. The distance between this face 28 and the indentation 7 constitutes the basic dimension, allowing the articulation of the big toe to be correctly positioned.

It will be perceived that the same dimension J can be reencountered in feet of different sizes, corresponding to different shoe sizes. In fact, the length of the toes, and of the big toe in particular, may vary for the same distance J. Moreover, some people, whose feet are relatively wide, are led to use a shoe size exceeding that which would strictly correspond to the overall length of their feet.

Reading off the adjustment of the block 2 or 102 to be carried out is done through the window 33, on the series corresponding to shoe size chosen by the user.

This shoe size can be read off at the intersection of the rear edge 37 of the stop 19 and of the sequence of the zones 35.

For the reasons set out above, it is possible that for a given dimension J, the edge 7 intersects two successive zones of different shoe sizes. It is the user who will indicate the size chosen and in accordance with this size, the reading will be effected through the window 33.

It should be noted that the sequence of the zones 35 is intended to facilitate the reading on the correct series S, but is not indispensable, because the user knows the size that suits him.

The adjustment of the block 2 or 102 under the sole of the shoe corresponding to the appropriate size, is effected by causing this block to slide longitudinally until the index 45 comes to be oposite the mark s bearing the same numeral as the mark s read off on the jig 1, for the size corresponding to that of the shoe.

When the shoe has been fixed on the pedal by means of the block thus adjusted, the articulation of the big toe will be found to be in a predetermined position in relation to the pedal axis. In the example envisaged, the assembly is designed in such a way that this articulation is opposite this pedal axis.

In FIG. 1, the contour of a user's foot has been traced, and the stop 19 is represented as bearing against the rear of the heel.

The shoe size read off in the sequence of the zones 35 (see FIG. 6), opposite the rear edge 37 corresponds either to size 39 (rear limit of zone N39), or to size 40.

Through the window 33 one will read, according to the size chosen, either the numeral 6, for size 39, or the numeral 3 for size 40.

In these conditions, the block 2 or 102 will be adjusted in such a way that its index is located opposite the numeral 6, if one is concerned with a shoe corresponding to size 39, or opposite the numeral 3, if one is concerned with a shoe corresponding to size 40.

The jig in accordance with the invention makes it possible to determine the block adjustment to be effected easily, quickly and accurately under the cyclist's shoe, in order to position the cyclist's foot correctly on the pedal and in an optimum mode. This jig can be entirely made of a plastic material.

The adjustment of the block under the sole is very simple and very fast, thanks to the marks provided under the sole in accordance with those of the jig.

In the solution described, the stop 19 cooperates with the rear of the heel of the foot. This solution is advantageous because in practice, the number of possible shoe sizes for one and the same dimension J is limited to two.

However, provision could be made for a jig wherein the sliding stop would come to coopeate with the front end of the foot.

I claim:

1. A jig for facilitating the adjustment of a block under the sole of a cyclist's shoe, comprising a support whereon the user's foot is intended to be positioned, characterized in that this support is provided with an indentation intended to receive the bulge corresponding to the articulation of the first metatarsal of the foot; that stop is slidably mounted along the longitudinal direction of the support, this stop being capable of being applied against one end of the foot, and that provision is made for at least one graduation along the longitudinal direction of the support, so as to cooperate with a specific zone of the stop, to indicate the correct adjustment of the block to be carried out, so that the articulation of the first metatarsal should occupy a specific position in relation to the pedal axis.

2. A jig according to claim 1, characterised in that the sliding stop is provided at the rear of the support so as to be applied against the rear of the heel of the user's foot, this stop being provided with an index cooperating with the graduation.

3. A jig according to claim 1, characterised in that the upper surface of the support has the longitudinal profile of an open V, the indentation being constituted by the point of the V.

4. A jig according to claim 1, characterised in that the graduation is formed by several series of marks and numbers, these marks and numbers being longitudinally staggered within one and the same series, the series being longitudinally and transversely staggered, each series being associated with one shoe size, the reading off of the graduation appropriate for the adjustment of the block being effected on the series corresponding to the size of the user's shoe.

5. A jig according to claim 1, characterised in that the graduation is established in such a way that the values read off on this graduation correspond to one adjustment of the block in relation to a reference line under the sole for the shoe size considered.

6. A jig according to claim 4, characterised in that the reference line is situated at a distance from the heel of the of the sole, equal to the statistical mean of the distance of the heel from the articulation of the first metatarsal as regards the users' feet having the shoe size corresponding to the sole.

7. A jig according to claim 5, characterised in that the series of marks and numbers of the jig are established by taking into account the structure of the pedal and of the block intended to be fixed under the shoe, in such a way that by effecting the adjustment of the block with the indications provided by the jig, the articulation of the first metatarsal is located opposite the geometrical axis of the pedal.

8. A jig according to claim 1, characterised in that the sliding stop comprises a transverse extension intended to cover up the graduation, this extension comprising at least one window, constituting the index, through which one can read off the value of the graduation appropriate for the adjustment.

9. A jig according to claim 4, characterised in that the series of marks and numbers situated substantially at the same longitudinal level and associated with different shoe sizes, have a different presentation facilitating identification of the series associated with the shoe size.

10. A jig according to claim 9, characterised in that the different presentation is formed by a different colour background associated with each shoe size.

11. A jig according to claim 7, characterised in that it comprises towards its other longitudinal edge a sequence of zones which can partly overlap, corresponding to the various possible shoe sizes.

12. A jig according to claim 11, characterised in that each of the zones has one presentation, in particular one colour, similar to that of the series wherewith it is to be associated.

13. A jig according to claim 1, characterised in that it comprises a frame whereon there is applied a sheet bearing the graduation, a plate made of a transparent material being applied against this sheet, so as to assume the shape of the frame, the user's foot being intended to be positioned on this transparent plate through which the graduation can be read off.

* * * * *